United States Patent Office.

ALEXANDER PARKS, JR., OF MARTINSBURG, WEST VIRGINIA.

METHOD OF UTILIZING THE WASTE OF BREWERIES, &c.

SPECIFICATION forming part of Letters Patent No. 345,987, dated July 20, 1886.

Application filed March 18, 1886. Serial No. 195,704. (No specimens.)

*To all whom it may concern:*

Be it known that I, ALEXANDER PARKS, Jr., a citizen of the United States, residing at Martinsburg, in the county of Berkeley and State of West Virginia, have invented certain new and useful Improvements in the Method of Utilizing the Waste of Breweries and Distilleries, of which the following is a specification.

This invention relates to certain improvements in the utilization of the waste from breweries and distilleries, and it has for its objects to provide for manufacturing a merchantable article left after drawing off the wort from the mash or the distillation of the same, as more fully hereinafter specified.

The invention, however, is specially designed for the utilization of the waste of distilleries, such as is left in the still after the spirit has been evaporated; and to this end it consists in running off such refuse into suitable vessels for collection, and subjecting the waste thus collected to the treatment hereinafter described.

The liquid waste is discharged into a suitable vessel or tank, and lime, lime-water, or other alkaline matter in suitable quantities to neutralize the acid in the slop is added. During the addition of the lime-water or other alkaline matter the mixture is thoroughly agitated or stirred in any suitable manner, so as to intimately commingle the whole, after which the mass is heated for a sufficient length of time to evaporate about two-thirds of the liquid portion of the same, leaving a condensed residuum in the vessel. This is then discharged into another vessel, and salt in proper proportions to flavor the same is added, after which heat is applied, preferably by means of steam, until the mass assumes a consistency capable of being shoveled or otherwise handled.

After being reduced to the condition above described, the material is conveyed to a suitable kiln or drying-chamber suitably heated in any convenient manner, wherein it is turned from time to time until thoroughly desiccated, being in the meantime divided by means of a shovel or otherwise into blocks of convenient size. It is then ground or reduced to meal or flour in a disintegrating burr or other mill, when it is ready to be put up for use.

By the admixture of the lime, lime-water, or other alkaline matter with the refuse, and allowing the whole to cool down, a partial precipitation takes place, separating the mass into a watery and heavy solution, the watery solution being above the heavy or partial precipitate. The watery solution may then be drawn off or discharged, if desired.

Having thus described my invention, what I claim, and desire to secure by Letters Patent, is—

The method herein described of utilizing the waste of breweries and distilleries, the same consisting in first neutralizing by lime the acid therein, then precipitating the solid portions, then partially evaporating the mass and adding salt, then further evaporating the mass, and finally desiccating and grinding the same, substantially as specified.

In testimony whereof I affix my signature in presence of two witnesses.

ALEXANDER PARKS, JR.

Witnesses:
HERBERT E. HANNIS,
LAWRENCE D. WEANING.